G. B. Montgomery,
Saw.
Nº 81,525.   Patented Aug. 25, 1868.
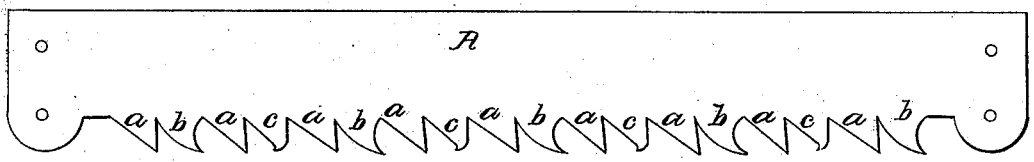
Witnesses:
Larry King.
John P. Smith.
Inventor:
Geo. B. Montgomery
per
Alexander D. Mason
atty.

United States Patent Office.

GEORGE B. MONTGOMERY, OF WINSLOW, INDIANA.

Letters Patent No. 81,525, dated August 25, 1868.

IMPROVEMENT IN SAWS.

The Schedule referred to in these Letters Patent and making part of the same.

TO ALL WHOM IT MAY CONCERN:

Be it known that I, GEORGE B. MONTGOMERY, of Winslow, in the county of Pike, and State of Indiana, have invented certain new and useful Improvements in "Saws;" and do hereby declare that the following is a full, clear, and exact description thereof, reference being had to the accompanying drawings, and to the letters of reference marked thereon, making a part of this specification.

My invention consists in the construction and arrangement of the teeth of an upright saw in such a manner that the lumber may be cut even and smooth, and with less friction and strain on the engine or other machinery than other saws.

In the annexed drawings, A represents the blade of an ordinary upright saw. The teeth of this blade are of three different forms. The teeth marked $a$ are those usually employed. The teeth marked $b$ are the hooked or cutting-teeth, with their points or hooks from the teeth $a$. These teeth cut or shave on the principle of a gauge, on the downward motion of the saw. The teeth marked $c$ are hooked similar to the teeth $b$, but the joint or hook end is in the direction just the reverse of the hooks $b$, and are about one-sixteenth of an inch shorter than the teeth $a$ or $b$. These teeth, by their peculiar construction, clear the dust from the centre of the log each way.

It will be seen that the teeth $a\ b\ c$ are arranged in "fours," or, in other words, as follows: $a\ b\ a\ c$. Teeth arranged as shown and specified constitute one set.

A saw of the above construction is simple and effectual. It requires less power to operate it, and performs its functions in a practical manner.

Having thus fully described my invention, what I claim, and desire to secure by Letters Patent, is—

The combination of the teeth $a\ b\ c$, the tooth $c$ being shorter than the teeth $a$ and $b$, and formed with the peculiar curved point, and all the different-formed teeth being alternately arranged as herein shown and described.

In testimony that I claim the foregoing, I have hereunto set my hand, this 30th day of March, 1868.

GEORGE B. MONTGOMERY.

Witnesses:
ASAHEL WHITMAN,
ELIJAH LUCAS.